US010854374B2

(12) United States Patent
Lehue

(10) Patent No.: US 10,854,374 B2
(45) Date of Patent: Dec. 1, 2020

(54) MOTOR VEHICLE SOLENOID VALVE

(71) Applicants: CONTINENTAL AUTOMOTIVE FRANCE, Toulouse (FR); CONTINENTAL AUTOMOTIVE GmbH, Hannover (DE)

(72) Inventor: Philippe Lehue, Lherm (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/422,580

(22) Filed: Feb. 2, 2017

(65) Prior Publication Data
US 2017/0225668 A1  Aug. 10, 2017

(30) Foreign Application Priority Data
Feb. 8, 2016  (FR) ..................... 16 50969

(51) Int. Cl.
*B60T 15/02*    (2006.01)
*F16K 31/06*    (2006.01)
*B60T 8/36*     (2006.01)
*H01F 7/16*     (2006.01)
*H01F 27/28*    (2006.01)
(Continued)

(52) U.S. Cl.
CPC .......... *H01F 27/289* (2013.01); *B60T 8/3615* (2013.01); *B60T 15/028* (2013.01); *F16K 1/14* (2013.01); *F16K 31/06* (2013.01); *F16K 31/0675* (2013.01); *F16K 31/0679* (2013.01); *H01F 7/127* (2013.01); *H01F 7/1607* (2013.01);
(Continued)

(58) Field of Classification Search
CPC .......... H01F 2007/1692; H01F 27/289; H05K 9/0071
USPC ......................... 335/256, 266, 301
See application file for complete search history.

(56) References Cited

U.S. PATENT DOCUMENTS 4,812,797 A * 3/1989 Jayakumar ......... G01R 33/3815
                                                324/320
4,851,799 A * 7/1989 Hilal .................. G01R 33/3815
                                                335/216
(Continued)

FOREIGN PATENT DOCUMENTS

DE  20 2008 005238 U1  7/2008
GB      2 280 313 A    1/1995

OTHER PUBLICATIONS

FR Search Report, dated Oct. 25, 2016, from corresponding FR application.
(Continued)

*Primary Examiner* — Seth W. Mackay-Smith
(74) *Attorney, Agent, or Firm* — Nixon & Vanderhye

(57) ABSTRACT

Disclosed is a motor vehicle solenoid valve (10). The solenoid valve includes a fixed body (20) intended to be mounted in a hydraulic system of the vehicle, a cylindrical coil supporting unit (40) mounted on the fixed body, a mobile body (30) slidingly mounted in the fixed body through the coil supporting unit and at least a first coil winding (50) arranged about the coil supporting unit and suitable for generating a magnetic field for control of the sliding of the mobile body. The solenoid valve further includes a second coil winding (60) arranged about the first coil winding in order to contain the magnetic field generated by the first coil winding.

20 Claims, 2 Drawing Sheets

(51) Int. Cl.
  *H01F 7/127*   (2006.01)
  *F16K 1/14*    (2006.01)
(52) U.S. Cl.
  CPC ... *B60T 2270/10* (2013.01); *H01F 2007/1692* (2013.01)

(56) References Cited

U.S. PATENT DOCUMENTS

| | | | | |
|---|---|---|---|---|
| 5,045,826 A * | 9/1991 | Laskaris | ............ | G01R 33/3815 |
| | | | | 174/15.4 |
| 5,668,516 A * | 9/1997 | Xu | ............ | G01R 33/3815 |
| | | | | 324/318 |
| 5,801,609 A * | 9/1998 | Laskaris | ............ | G01R 33/421 |
| | | | | 324/319 |
| 5,900,794 A * | 5/1999 | Palkovich | ............ | G01R 33/421 |
| | | | | 335/216 |
| 6,816,046 B1 * | 11/2004 | Varney | ............ | G01R 33/3815 |
| | | | | 335/216 |
| 6,819,208 B1 * | 11/2004 | Peghaire | ............ | F01L 9/04 |
| | | | | 251/129.01 |
| 7,170,291 B2 * | 1/2007 | Westphal | ............ | G01R 33/3815 |
| | | | | 324/319 |
| 8,258,903 B2 * | 9/2012 | Schnur | ............ | G01R 33/3815 |
| | | | | 324/318 |
| 9,274,188 B2 * | 3/2016 | Shen | ............ | G01R 33/34023 |
| 9,279,871 B2 * | 3/2016 | Shen | ............ | G01R 33/34092 |
| 2006/0097830 A1 | 5/2006 | Forsythe et al. | | |
| 2014/0048732 A1 * | 2/2014 | Heyer | ............ | B60T 8/363 |
| | | | | 251/129.15 |

OTHER PUBLICATIONS

Office Action issued in Chinese Patent Application No. 201710066850.5 dated Dec. 30, 2019.

* cited by examiner

MOTOR VEHICLE SOLENOID VALVE

FIELD OF THE INVENTION

The present invention relates to the field of the hydraulic system of a motor vehicle and more particularly relates to a solenoid valve of a motor vehicle.

When the driver of the vehicle wishes to slow it down, the driver actuates, in a known manner, the brakes via a pedal which commands a hydraulic circuit.

BACKGROUND OF THE INVENTION

Nowadays, it is known to provide motor vehicles with safety devices, such as the anti-lock braking system which is better known as ABS, which acts on the brakes of the vehicle to prevent the wheels from locking.

More precisely, during braking of the vehicle, the closure of the hydraulic circuit is commanded by a solenoid valve in order to stop the braking of a wheel when the latter is locked by the brake. Preventing the wheels from locking during braking makes it possible to reduce the risk of the vehicle skidding, which increases the safety of the driver.

As illustrated in FIG. 1, such a solenoid valve 1 comprises, in a known manner, a fixed body 2, a mobile body 3 slidingly mounted in the fixed body 2, a coil supporting means 4 mounted on the fixed body 2 and a coil 5 for generating a magnetic field, which coil is mounted on said coil supporting means 4.

Such a magnetic field commands the sliding of the mobile body 3, between a position for opening and a position for closing the hydraulic circuit in which the mobile body 3 allows the hydraulic circuit to be blocked in order to prevent the braking of the wheel.

A magnetic return single-piece case 6 is mounted about the coil 5 in order to contain the magnetic field inside the case 6 and thus increase the effectiveness of the magnetic field which causes the mobile body 3 to move.

Such a single-piece case 6 is manufactured by stamping or folding, which is complex and costly. Furthermore, this case 6 must be mounted on the solenoid valve 1, which adds a time-consuming and costly step to the assembly of the solenoid valve 1.

SUMMARY OF THE INVENTION

Therefore, the aim of the invention is to solve at least some of these disadvantages by proposing a simple, effective and reliable solution for the magnetic return of a solenoid valve.

To this end, the subject matter of the invention is a motor vehicle solenoid valve, comprising a fixed body intended to be mounted in a hydraulic system of the vehicle, a cylindrical coil supporting means mounted on said fixed body, a mobile body slidingly mounted in said fixed body through said coil supporting means and at least a first coil winding arranged about the coil supporting means and suitable for generating a magnetic field for control of the sliding of said mobile body, said solenoid valve further comprising a second coil winding arranged about the first coil winding in order to contain the magnetic field generated by said first coil winding.

Thanks to the solenoid valve according to the invention, the magnetic field is contained thanks to the second coil winding formed about the first coil winding generating said magnetic field. Such a second coil winding is easy to produce, and this limits the assembly costs thereof.

Preferably, since the fixed body extends longitudinally up to a free end, the solenoid valve comprises at least one washer mounted at said free end in order to form a case closed about the first coil winding.

Preferentially, the solenoid valve comprises an insulator placed between the first coil winding and the second coil winding in order to electrically insulate the first coil winding from the second coil winding.

Preferably, since the second coil winding comprises at least one wire extending from a first end to a second end, said first end and said second end are linked to one another in order to form a loop containing the magnetic field.

Preferentially, the first coil winding and the second coil winding are produced from different materials.

The invention also relates to a motor vehicle comprising a hydraulic system, said hydraulic system comprising at least one solenoid valve as described above.

The invention further relates to a method of assembling a motor vehicle solenoid valve, said solenoid valve comprising a fixed body, intended to be mounted in a hydraulic system of the vehicle, a cylindrical coil supporting means mounted on said fixed body and a mobile body slidingly mounted in said fixed body through said coil supporting means, the method comprising a step of winding at least a first metal wire about the coil supporting means in order to form a first coil winding suitable for generating a magnetic field for control of the sliding of the mobile body, and a step of winding a second metal wire about said first coil winding in order to form a second coil winding, said second coil winding being suitable for containing the magnetic field generated by the first coil winding.

Thanks to the method according to the invention, the assembly of a solenoid valve is quick and easy, which reduces the costs thereof, thanks to the second winding containing the magnetic field formed by winding.

Preferably, the steps of winding the first coil winding and the second coil winding are carried out by a same winding machine. Thus, the second coil winding can be formed with the same machine as the first coil winding and does not require an additional mounting operation which makes the assembly easy and quick and thus reduces the costs thereof.

BRIEF DESCRIPTION OF THE DRAWINGS

Other features and advantages of the invention will emerge during the following description with reference to the appended figures given as nonlimiting examples and wherein identical references are given to similar objects.

DETAILED DESCRIPTION OF THE INVENTION

Presented hereafter is a solenoid valve of an ABS system of a motor vehicle. It will be noted that such a use does not limit the scope of the present invention which can be used for any hydraulic system of a vehicle and for any vehicle type.

Figure 2:
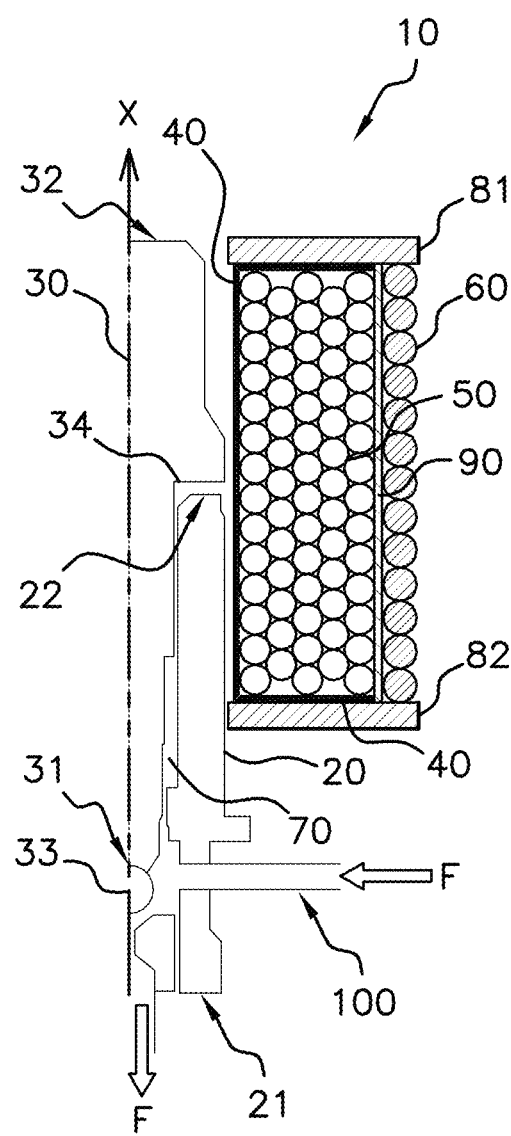
FIG. 2 schematically shows, in section, an embodiment of the solenoid valve according to the invention in the open position.
Figure 3:
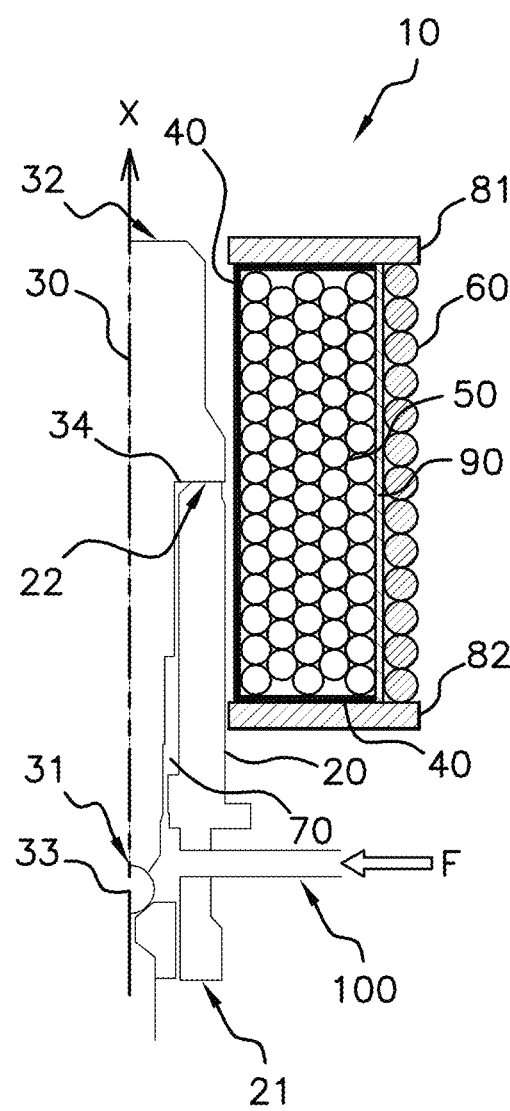
FIG. 3 schematically shows, in section, the solenoid valve of FIG. 2 in the closed position.

Referring to FIGS. 2 and 3, a solenoid valve 10 of an anti-lock braking system, also referred to as ABS, of a motor vehicle is shown. The solenoid valve 10 is mounted in an ABS module (not shown) which can, furthermore, comprise a plurality of solenoid valves. This ABS module is connected to a hydraulic circuit for commanding braking of the vehicle.

The solenoid valve 10 comprises a fixed body 20, a mobile body 30 slidingly mounted in the fixed body 20, a coil supporting means 40 mounted on the fixed body 20 and a first coil winding 50 for generating a magnetic field C, which is mounted on said coil supporting means 40.

The fixed body 20 is mounted on the ABS module at a pipe 100 of the hydraulic circuit in which a liquid, preferably brake fluid F, flows. The fixed body 20 extends longitudinally along a longitudinal axis X in the coil supporting means 40 and comprises a proximal end 21 and a distal end, with respect to the pipe 100, the distal end also being referred to as the free end 22.

The fixed body 20 defines, at the center thereof, a sliding hole for the mobile body 30. Advantageously, the fixed body 20 is produced from a material allowing the circulation of a magnetic field, preferably a metal material.

The mobile body 30 extends longitudinally along the longitudinal axis X and is slidingly mounted, along the longitudinal axis X, in the sliding hole of the fixed body 20. The mobile body 30 comprises, with respect to the pipe 100, a proximal end 31 and a distal end 32. A closing member 33 is mounted at the proximal end 31 of the mobile body 30. This closing member 33 is suitable for engaging the pipe 100 of the hydraulic circuit in order to open and close it. Advantageously, the mobile body 30 is produced from a material allowing the circulation of a magnetic field, preferably a metal material. The mobile body 30 further comprises a shoulder 34 suitable for forming an air gap with the fixed body 20, preferably at the free end 22 thereof. Moreover, the mobile body 30 is suitable for switching between a first position, as illustrated in FIG. 2, in which the pipe 100 is open, allowing the brake fluid F to flow, and a second position, as illustrated in FIG. 3, in which the closing member 33 obstructs the pipe 100 in order to block the flow of the brake fluid F.

Figure 1:
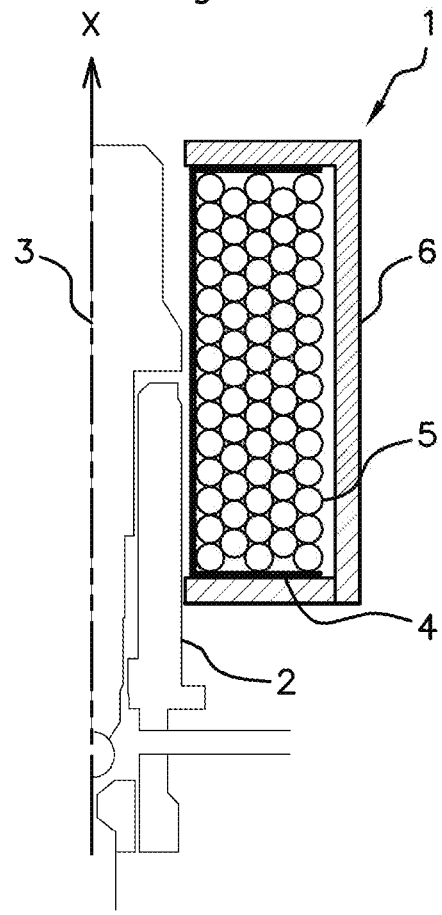
FIG. 1 schematically shows, in section, a solenoid valve according to the prior art.
Figure 4:
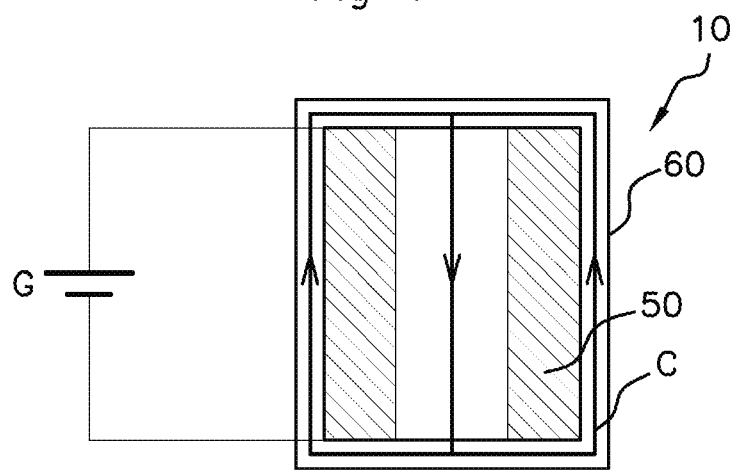
FIG. 4 schematically shows the magnetic field generated in the solenoid valve of FIG. 2.

The first coil winding 50 is made up of an inductive coiling wound on the coil supporting means 40 about the longitudinal axis X. In other words, since the cylindrical coil supporting means 40 comprises a cylindrical outer surface, the first coil winding 50 is wound about said cylindrical outer surface. Preferably, this inductive coiling is made up of one or more metal wires. As illustrated in FIG. 4, the first coil winding 50 is suitable for being linked to a generator G of electric current, the flow of which in the first coil winding 50 generates a magnetic field C. This magnetic field C causes the mobile body 30 to slide in the sliding hole of the fixed body 20 until the mobile body 30 assumes the second position thereof for obstructing the pipe 100 and in which the shoulder 34 enters into contact with the fixed body 20 at the air gap.

According to the invention, the solenoid valve 10 comprises a second coil winding 60 produced about the first coil winding 50.

The second winding 60 makes up a coil wound about the first coil winding 50 along the longitudinal axis X. In other words, since the first coil winding 50 forms a cylindrical coil comprising a substantially cylindrical outer surface, the second coil winding 60 is wound about said outer surface. Thus, the first coil winding 50 and the second coil winding 60 are coaxial. Preferably, this second coil winding 60 comprises at least one wire wound about the wire or wires of the first coil winding 50. The second coil winding 60 makes it possible to contain the magnetic field C generated by the first coil winding 50 inside the second coil winding 60 in order to reduce or eliminate the magnetic losses.

The solenoid valve 10 shown here is a solenoid valve that is naturally open. Therefore, it comprises a return means 70, which is, for example, in the form of a spring, placed between the fixed body 20 and the mobile body 30 in order to hold the mobile body 30 in the first position for opening the pipe 100 when no magnetic field C is generated by the first coil winding 50. Thus, when the first coil winding 50 does not generate a magnetic field C, the hydraulic pipe 100 is open.

In order to further reduce the magnetic losses, the solenoid valve 10 further comprises a first washer 81 and a second washer 82. Each of the first washer 81 and the second washer 82 is mounted at an end of the second coil winding 60 and engages the latter in order to form a magnetic return case for the magnetic field generated by the first winding 50.

In this example, the solenoid valve 10 further comprises an insulator 90, arranged between the first coil winding 50 and the second coil winding 60 in order to electrically insulate them from one another and thus prevent any risk of short circuit. Alternatively or additionally, the wire of the second coil winding 60 could be insulated in order to reduce the number of elements in the solenoid valve 10.

Thus, when a wheel of the vehicle is locked by the brake disc during braking of the vehicle, the solenoid valve 10 of the ABS system closes the hydraulic circuit. To do this, the generator G of electric current supplies the first coil winding 50 with electricity in order to generate a magnetic field C. This magnetic field C is contained inside the second coil winding 60 so as to limit the losses. The magnetic field C moves the mobile body 30 until it is in contact with the fixed body 20. The mobile body 30 then switches to the position for closing the pipe 100, the closing member 33 blocking the pipe 100 in which the brake fluid F of the hydraulic circuit flows. When the pipe 100 is blocked, the brake is deactivated and the brake pads move away from the brake disc in order to prevent the wheels from locking (in the case of braking with discs), which reduces the risk of the vehicle skidding and thus increases the safety of the driver of the vehicle. The method of assembling a solenoid valve according to the invention will now be shown.

The mobile body 30 is mounted in the sliding hole of the fixed body 20 and the spring 70 is placed between the fixed body 20 and the mobile body 30 in order to naturally open the solenoid valve 10. The fixed body 20 is then inserted into the coil supporting means 40.

Then, the solenoid valve 10 is placed in a winding machine which coils a first wire about the coil supporting means 40 in order to form the first coil winding 50.

Advantageously, the second coil winding 60 is formed in the same winding machine by winding a second wire about the first coil winding 50 such that the first coil winding 50 and the second coil winding 60 are stacked.

Preferably, the first coil winding 50 and the second coil winding 60 are produced with different wires.

Advantageously, the ends of the wire of the second coil winding 60 are linked in order to form a loop.

The nut 81 is then mounted at the end of the second coil winding 60 in order to form a case closed about the first coil winding 50.

It should be finally noted that the present invention is not limited to the examples described above and may have many alternatives that are accessible to a person skilled in the art.

The invention claimed is:

1. A motor vehicle solenoid valve (10), comprising:
   a fixed body (20) intended to be mounted in a hydraulic system of the vehicle,
   a cylindrical coil support (40) mounted on said fixed body (20), the fixed body (20) extending along a longitudinal axis (X) in the coil support (40), the coil support comprising a first part extending along the longitudinal axis (X), a second top part extending radially from a top of the first part, and a third bottom part extending radially from a bottom of the first part,
   a mobile body (30) slidingly mounted in said fixed body (20) through said coil support (40),
   at least a first coil winding (50) arranged about the first part of the coil support (40) within the second top part and the third bottom part of the coil support (40), the at least a first coil winding (50) being suitable for generating a magnetic field for control of the sliding of said mobile body (30), the at least a first coil winding (50) having an outer surface, and
   a second coil winding (60) arranged about the outer surface of the first coil winding (50) in order to contain the magnetic field generated by said first coil winding (50), the first coil winding (50) and the second coil winding (60) being coaxial, the second coil winding (60) located radially outside the second top and third bottom parts of the coil support (40) and extending from radially outside of the third bottom part of the coil support (40) to radially outside of the second top part of the coil support (40).

2. The motor vehicle solenoid valve (10) according to claim 1, wherein,
   the fixed body (20) extends longitudinally up to a free end (22), and
   the solenoid valve (10) further comprises at least one washer (81) mounted at said free end (22) on a surface of the second top part of the coil support (40) and extending radially beyond an outer edge of the second top part of the coil support (40).

3. The motor vehicle solenoid valve (10) according to claim 2, comprising an insulator (90) placed between the first coil winding (50) and the second coil winding (60).

4. The motor vehicle solenoid valve (10) according to claim 2, wherein, the second coil winding (60) comprises at least one wire extending from a first end to a second end, and said first end and said second end are linked to one another.

5. The motor vehicle solenoid valve (10) according to claim 2, wherein the first coil winding (50) and the second coil winding (60) comprise different materials.

6. The motor vehicle comprising a hydraulic system, said hydraulic system comprising at least one motor vehicle solenoid valve (10) according to claim 2.

7. The motor vehicle solenoid valve (10) according to claim 1, further comprising an insulator (90) placed between the first coil winding (50) and the second coil winding (60).

8. The motor vehicle solenoid valve (10) according to claim 7, wherein, the second coil winding (60) comprises at least one wire extending from a first end to a second end, and said first end and said second end are linked to one another.

9. The motor vehicle solenoid valve (10) according to claim 7, wherein the first coil winding (50) and the second coil winding (60) comprise different materials.

10. The motor vehicle comprising a hydraulic system, said hydraulic system comprising at least one solenoid motor vehicle valve (10) according to claim 7.

11. The motor vehicle solenoid valve (10) according to claim 1, wherein, the second coil winding (60) comprises at least one wire extending from a first end to a second end, and said first end and said second end are linked to one another.

12. The motor vehicle solenoid valve (10) according to claim 11, wherein the first coil winding (50) and the second coil winding (60) comprise different materials.

13. The motor vehicle comprising a hydraulic system, said hydraulic system comprising at least one motor vehicle solenoid valve (10) according to claim 11.

14. The motor vehicle solenoid valve (10) according to claim 1, wherein the first coil winding (50) and the second coil winding (60) comprise different materials.

15. A motor vehicle comprising a hydraulic system, said hydraulic system comprising at least one motor vehicle solenoid valve (10) according to claim 1.

16. A method of assembling a motor vehicle solenoid valve (10) of claim 1, the method comprising:
    a step of winding at least a first metal wire about the coil support (40) in order to form the first coil winding (50) suitable for generating a magnetic field for control of the sliding of the mobile body (30), and
    a step of winding a second metal wire about said first coil winding (50) in order to form the second coil winding (60), said second coil winding (60) being suitable for containing the magnetic field generated by the first coil winding (50).

17. The method according to claim 16, wherein the steps of winding the first coil winding (50) and the second coil winding (60) are carried out by a same winding machine.

18. The motor vehicle solenoid valve (10) according to claim 1, wherein,
    the second coil winding (60) comprises at least one wire extending from a first end of the second coil winding (60) to a second end of the second coil winding (60), said first end and said second end being linked to one another,
    the solenoid valve (10) further comprises a first washer (81) mounted at the first end of the second coil winding (60) and a second washer (82) mounted at the second end of the second coil winding (60),
    the first washer (81) extending across a top end of the cylindrical coil support (40) and extending over the first end of the second coil winding (60),
    the second washer (82) extending across a bottom end of cylindrical coil support (40) and extending over the second end of the second coil winding (60), and
    each of the first washer (81) and the second washer (82) engage the second coil winding (60) thereby forming a magnetic return case for the magnetic field generated by said first coil winding (50).

19. The motor vehicle solenoid valve (10) according to claim 18, further comprising:
    an insulator (90) arranged between the first coil winding (50) and the second coil winding (60) electrically insulating the first coil winding (50) from the second coil winding (60),
    the first washer (81) extending across a top end of the insulator (90), and
    the second washer (82) extending over a bottom end of the insulator (90).

20. The motor vehicle solenoid valve (10) according to claim 1, further comprising:
    a first washer (81) mounted on a surface of the top part of the coil support (40) and extending radially beyond an outer edge of the top part of the coil support (40), and a second washer (82) mounted on a surface of the third bottom part of the coil support (40) and extending radially beyond an outer edge of the third bottom part of the coil support (40),
wherein the second coil winding (60) extends between a radially outer portion of the first and second washers (81, 82).

* * * * *